(12) United States Patent
Vajapeyam et al.

(10) Patent No.: US 8,774,092 B2
(45) Date of Patent: Jul. 8, 2014

(54) ENHANCING UPLINK COVERAGE IN INTERFERENCE SCENARIOS

(75) Inventors: Madhavan Srinivasan Vajapeyam, San Diego, CA (US); Tingfang Ji, San Diego, CA (US); Aleksandar Damnjanovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/090,151

(22) Filed: Apr. 19, 2011

(65) Prior Publication Data

US 2011/0255468 A1 Oct. 20, 2011

Related U.S. Application Data

(60) Provisional application No. 61/326,058, filed on Apr. 20, 2010.

(51) Int. Cl.
 *H04W 4/00* (2009.01)
(52) U.S. Cl.
 USPC .......................................... 370/328; 455/452.1
(58) Field of Classification Search
 USPC .............................. 370/328; 455/452.1, 67.13
 See application file for complete search history.

(56) References Cited

U.S. PATENT DOCUMENTS

| 2009/0083601 A1* | 3/2009 | Gorokhov et al. ............ 714/748 |
| 2009/0109939 A1 | 4/2009 | Bhushan et al. |
| 2009/0131065 A1* | 5/2009 | Khandekar et al. ......... 455/452.1 |

FOREIGN PATENT DOCUMENTS

| JP | 2010045790 A | 2/2010 |
| WO | 2009055619 | 4/2009 |
| WO | WO-2009044537 A1 | 4/2009 |
| WO | 2009065075 A1 | 5/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 9)", 3GPP Standard; 3GPP TS 36.211, 3rd Generation Partnership Project (3GPP), Mobile Competence Centre ; 650, Route Des Lucioles ; F-06921 Sophia-Antipolis Cedex ; France, No. V9.1.0, Mar. 21, 2010, pp. 1-85, XP050401970, [retrieved on Mar. 21, 2010].
Huawei: "LTE non-CA based HetNet support", 3GPP Draft; R1-101982, 3rd Generation Partnership Project (3GPP), Mobile Competence Centre ; 650, Route Des Lucioles ; F-06921 Sophia-Antipolis Cedex ; France, vol. RAN WG1, No. Beijing, china; 20100412, Apr. 6, 2010, XP050419319, [retrieved on Apr. 6, 2010].
International Search Report and Written Opinion—PCT/US2011/033215—ISA/EPO—Jul. 25, 2011.

(Continued)

*Primary Examiner* — Albert T Chou
(74) *Attorney, Agent, or Firm* — Dalei Dong

(57) ABSTRACT

A method for wireless communication in a Long Term Evolution (LTE) network includes transmitting a request, from a first evolved Node B (eNodeB) of the LTE network to a second eNodeB of the LTE network, for the second eNodeB to yield a bundles of non-consecutive subframes. The method also includes configuring a User Equipment (UE), which is associated with the first eNodeB and experiencing interference from the second eNodeB, for uplink transmission in the plurality of bundles of non-consecutive subframes.

22 Claims, 10 Drawing Sheets

(56) References Cited

OTHER PUBLICATIONS

LG Electronics: "Coordination for DL control channel in co-channel HeNB deployment", 3GPP Draft; R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; 20100412, Apr. 6, 2010, XP050419640, [retrieved on Apr. 6, 2010].

NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F06921 Sophia-Antipolis Cedex ; France, vol. RAN WG1, No. Beijing, china; 20100412, Apr. 7, 2010, XP050419698, [retrieved on Apr. 7, 2010].

Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; 20100222, Feb. 16, 2010, XP050418951, [retrieved on Feb. 16, 2010].

Vikram Chandrasekhar, et al., "Uplink Capacity and Interference Avoidance for Two-Tier Cellular Networks" Global Telecommunications Conference, 2007. Globecom '07. IEEE, Piscataway, NJ, USA, Nov. 1, 2007, pp. 3322-3326, XP031196558.

* cited by examiner

ENHANCING UPLINK COVERAGE IN INTERFERENCE SCENARIOS

CROSS-REFERENCE TO RELATED APPLICATION

This application claims the benefit under 35 U.S.C. §119(e) to U.S. Provisional Patent Application No. 61/326,058 entitled SYSTEMS AND METHODS FOR ENHANCING UPLINK COVERAGE IN INTERFERENCE SCENARIOS, filed on Apr. 20, 2010, the disclosure of which is expressly incorporated by reference herein in its entirety.

BACKGROUND

1. Field

Aspects of the present disclosure relate generally to wireless communication systems, and more particularly, to systems and methods for enhancing uplink coverage in interference scenarios.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to some aspects of the disclosure, a method for wireless communication in a Long Term Evolution (LTE) network includes transmitting a request, from a first evolved Node B (eNodeB) of the LTE network to a second eNodeB of the LTE network, for the second eNodeB to yield bundles of non-consecutive subframes. The method may also include configuring a User Equipment (UE), which is associated with the first eNodeB and experiencing interference from the second eNodeB, for uplink transmission in the bundles of non-consecutive subframes.

According to some aspects of the disclosure, a method for wireless communication in a Long Term Evolution (LTE) network includes associating a User Equipment (UE) with a first evolved Node B (eNodeB) while experiencing interference from a second eNodeB. The method may also include receiving signaling configuring the UE for uplink transmission in bundles of non-consecutive subframes.

According to some aspects of the disclosure, an apparatus for wireless communication in a Long Term Evolution (LTE) network includes means for transmitting a request, from a first evolved Node B (eNodeB) of the LTE network to a second eNodeB of the LTE network, for the second eNodeB to yield bundles of non-consecutive subframes. The apparatus may also include means for configuring a User Equipment (UE), which is associated with the first eNodeB and experiencing interference from the second eNodeB, for uplink transmission in the bundles of non-consecutive subframes.

According to some aspects of the disclosure, an apparatus for wireless communication in a Long Term Evolution (LTE) network includes means for associating a User Equipment (UE) with a first evolved Node B (eNodeB) while experiencing interference from a second eNodeB. The apparatus may also include means for receiving signaling configuring the UE for uplink transmission in bundles of non-consecutive subframes.

According to some aspects of the disclosure, an apparatus for wireless communication in a Long Term Evolution (LTE) network includes a memory and at least one processor coupled to the memory where the at least one processor is configured to transmit a request, from a first evolved Node B (eNodeB) of the LTE network to a second eNodeB of the LTE network, for the second eNodeB to yield bundles of non-consecutive subframes. The at least one processor is further configured to configure a User Equipment (UE), which is associated with the first eNodeB and experiencing interference from the second eNodeB, for uplink transmission in the bundles of non-consecutive subframes.

According to some aspects of the disclosure, an apparatus for wireless communication in a Long Term Evolution (LTE) network includes a memory and at least one processor coupled to the memory. The at least one processor is configured to associate a User Equipment (UE) with a first evolved Node B (eNodeB) while experiencing interference from a second eNodeB. The at least one processor is further configured to receive signaling configuring the UE for uplink transmission in bundles of non-consecutive subframes.

According to some aspects of the disclosure, a computer program product for wireless communication in a Long Term Evolution (LTE) network includes a computer-readable medium having a program code recorded thereon. The program code includes program code to transmit a request, from a first evolved Node B (eNodeB) of the LTE network to a second eNodeB of the LTE network, for the second eNodeB to yield bundles of non-consecutive subframes. The program code also includes program code to configure a User Equipment (UE), which is associated with the first eNodeB and experiencing interference from the second eNodeB, for uplink transmission in the bundles of non-consecutive subframes.

According to some aspects of the disclosure, a computer program product for wireless communication in a Long Term Evolution (LTE) network includes a computer-readable medium having a program code recorded thereon. The program code includes program code to associate a User Equipment (UE) with a first evolved Node B (eNodeB) while experiencing interference from a second eNodeB. The program code also includes program code to receive signaling configuring the UE for uplink transmission in bundles of non-consecutive subframes.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
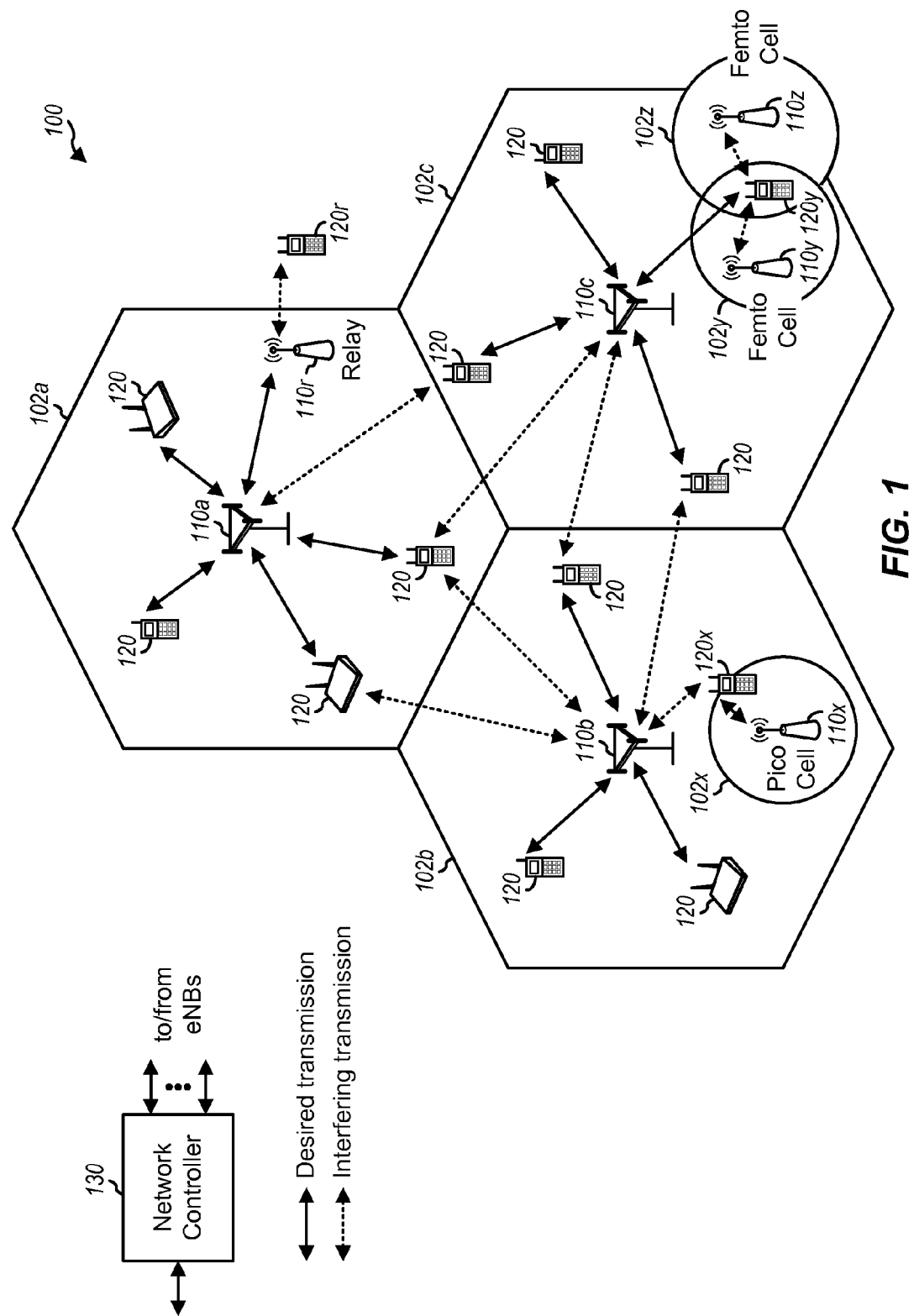
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
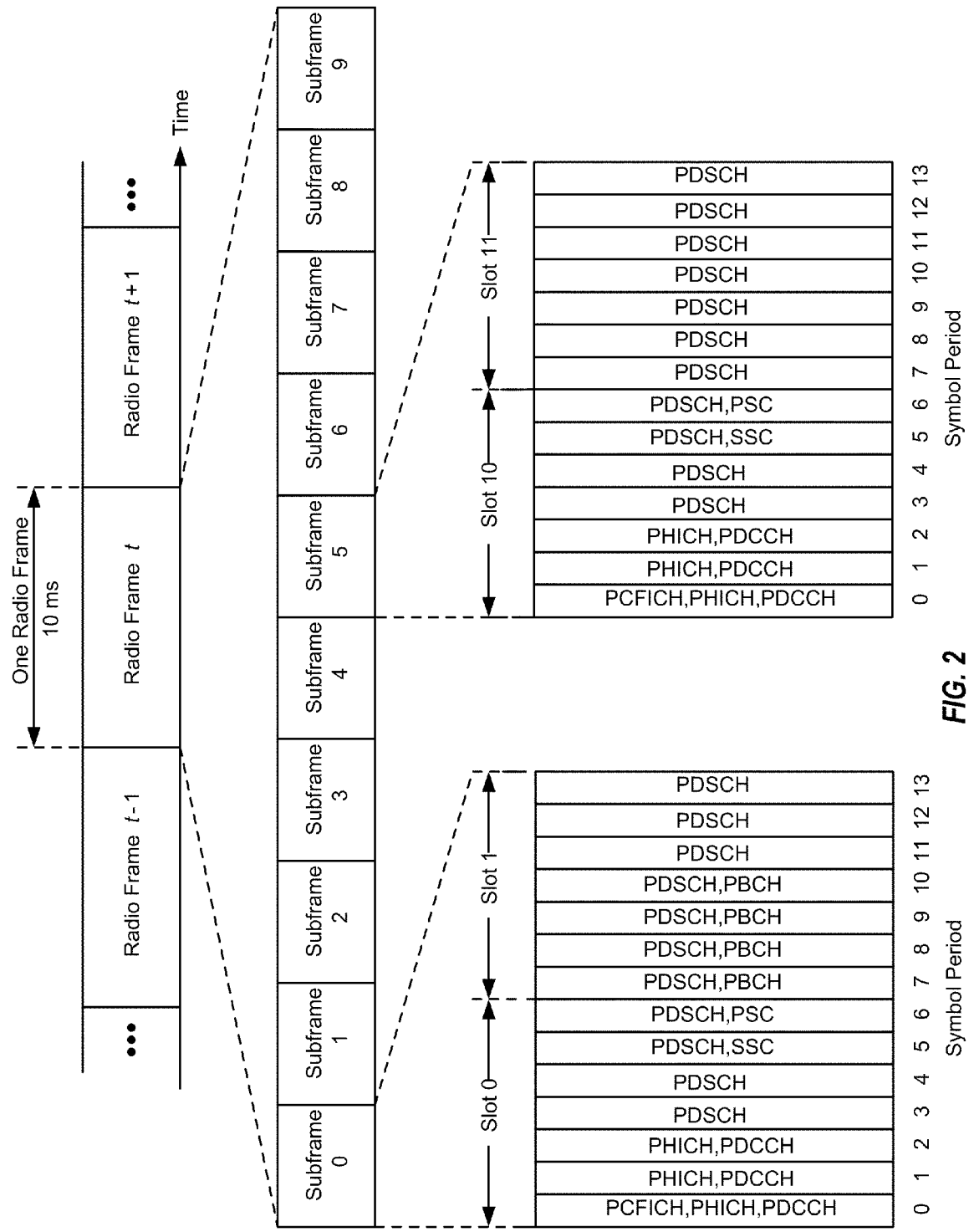
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
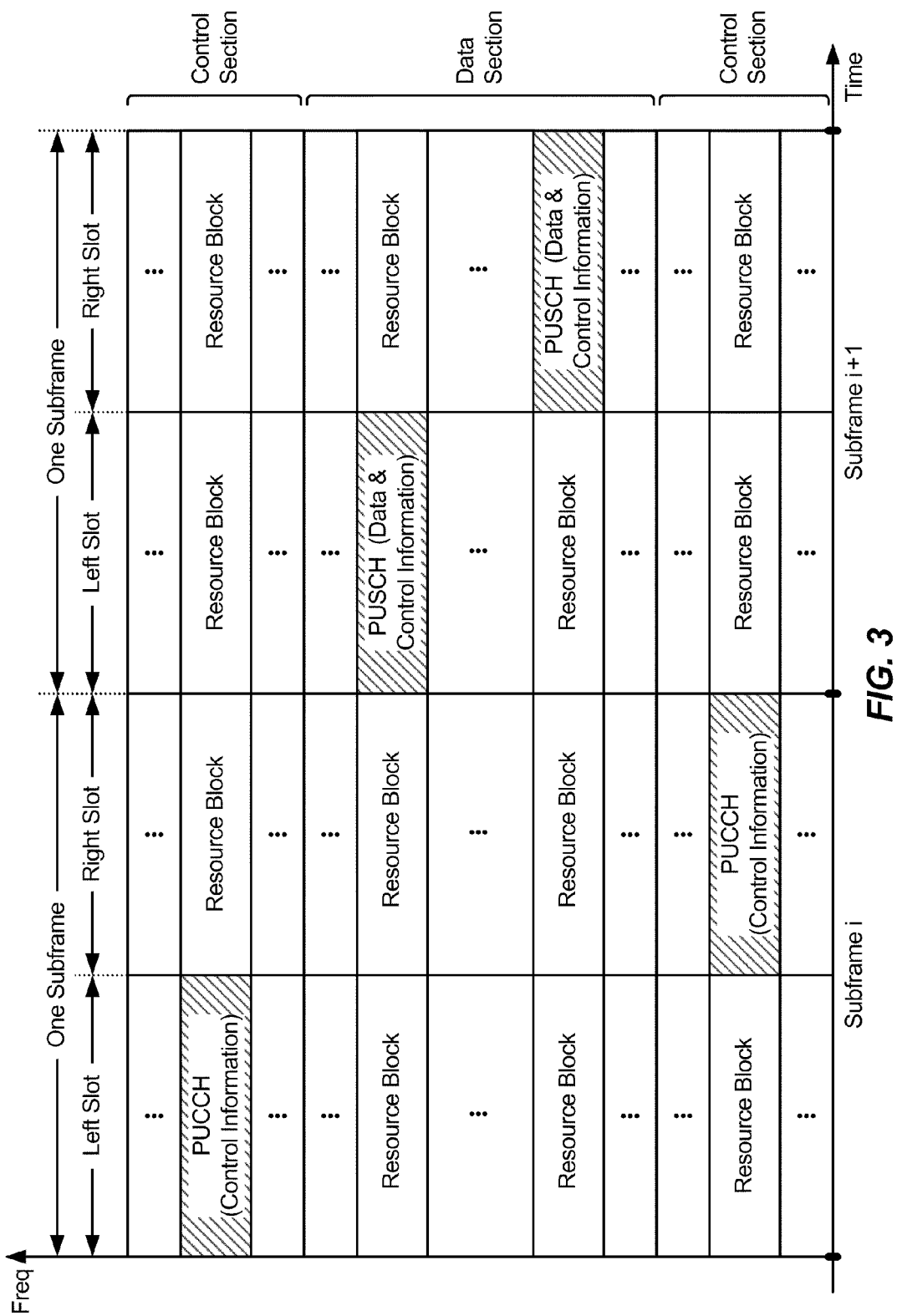
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the uplink resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
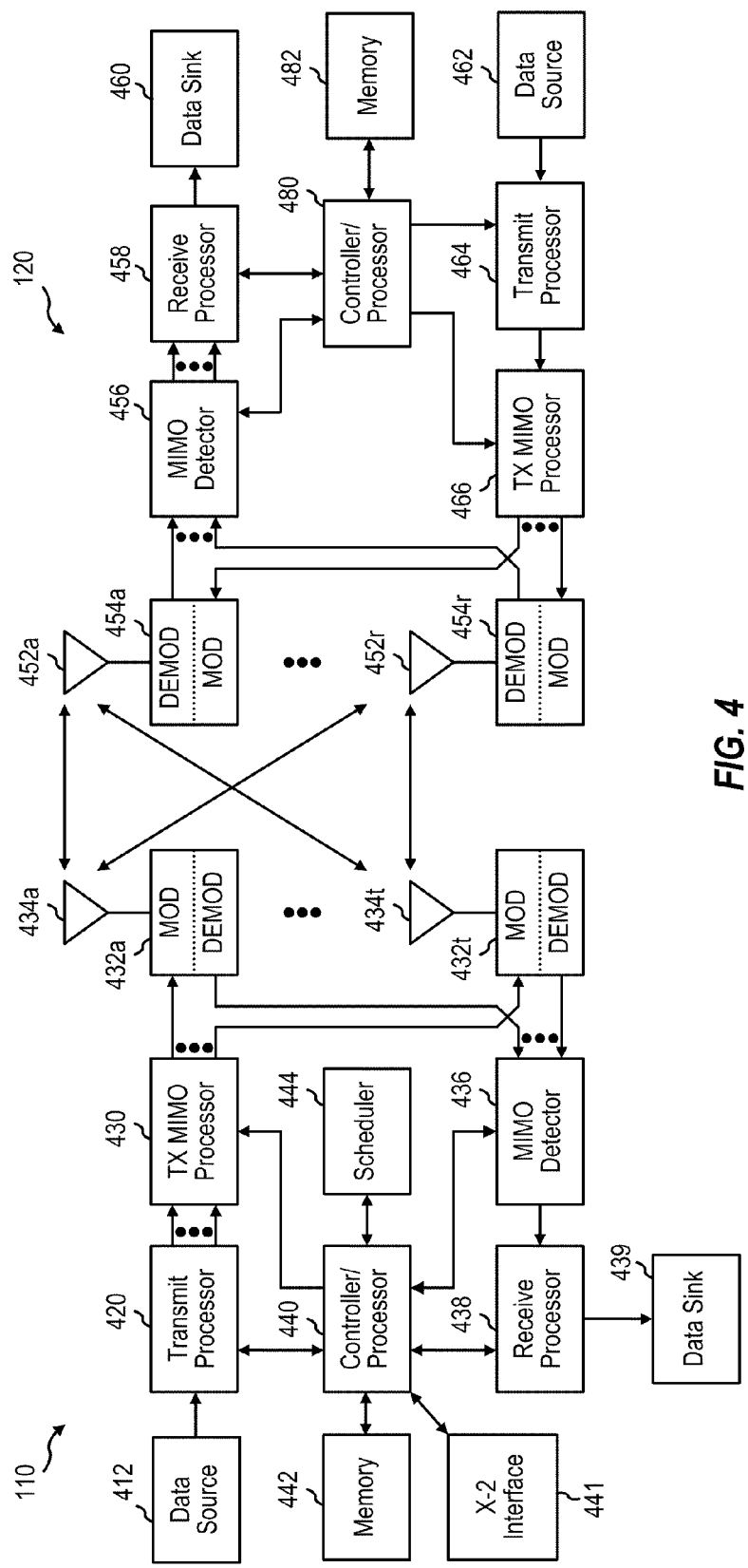
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH)

from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 440 and/or other processors and modules at the eNodeB may also perform or direct the execution of the functional blocks illustrated in FIG. 10, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
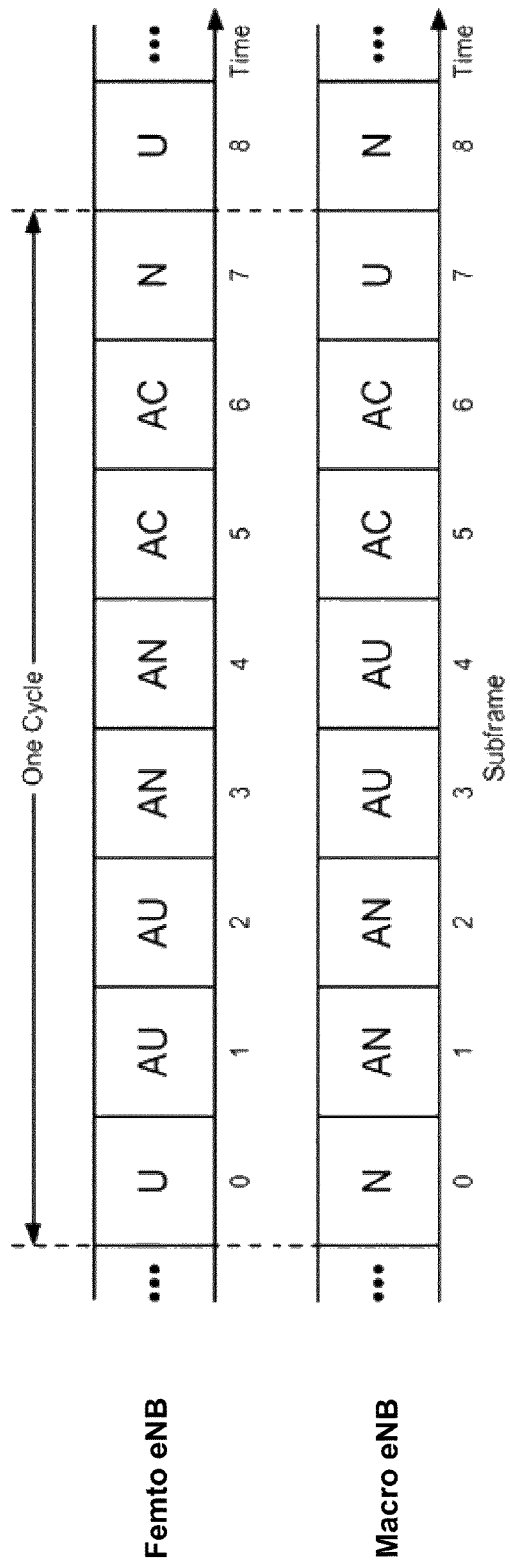
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrates sub frame assignments for a femto eNodeB, and a second row of blocks illustrates sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Enhancing Uplink Coverage in Interference Scenarios

When operating in the connected mode, the UE 120y may experience so much interference in this dominant interference scenario that it may no longer be able to maintain an acceptable connection with the eNodeB 110c, for example. The analysis of interference by the UE 120y includes obtaining the signal quality, such as by calculating the error rate of the PDCCH received on the downlink from the eNodeB 110c. Alternatively, the error rate of the PDCCH may be predicted based on the signal-to-noise ratio (SNR) of the PDCCH. If the error rate of the PDCCH, as calculated by the UE 120y, reaches a predefined level, the UE 120y will declare a radio link failure (RLF) to the eNodeB 110c and end the connection. At this point, the UE 120y may attempt to reconnect to the eNodeB 110c or possibly attempt to connect to another eNodeB with a stronger signal.

A dominant interference scenario may also occur due to range extension, which is a scenario in which a UE connects to an eNodeB with lower path loss and lower SNR among all eNodeBs detected by the UE. For example, in FIG. 1, the UE 120x may detect the macro eNodeB 110b and the pico eNodeB 110x and may have lower received power for the eNodeB 110x than the eNodeB 110b. Nevertheless, it may be desirable for the UE 120x to connect to the pico eNodeB 110x if the path loss for the eNodeB 110x is lower than the path loss for the macro eNodeB 110b. This may result in less interference to the wireless network for a given data rate for the UE 120x.

With range extension enabled in a wireless network, such as the wireless network 100, in order for UEs to obtain service from a lower power base station (i.e., a pico or femto base station) in the presence of a macro base station with stronger downlink signal strength, or for the UEs to obtain service from a macro base station in the presence of a strongly interfering signal from a femto base station to which the UE is not authorized to connect, an enhanced inter-cell interference coordination (eICIC) is used to coordinate the interfering base station giving up some resources in order to enable control and data transmissions between the UE and the serving base station. When a network supports eICIC, the base stations negotiate with each other to coordinate resources in order to reduce/eliminate interference by the interfering cell yielding part of its resources. With this, a UE can access the serving cell even with severe interference by using the resources yielded by the interfering cell.

For example, a coverage lapse within a macro cell may exist when a femto cell with a closed access mode, in which only member femto UEs may access the cell, lies within the coverage area of the macro cell. By making this femto cell yield some of its resources, the UE within the femto cell coverage area may access its serving macro cell by using the resources from the femto cell. In a radio access system using OFDM such as E-UTRAN, these yielded resources may be time-based, frequency-based, or a combination of both. When the yielded resources are time-based, the interfering cell refrains from using some of its accessible subframes in the time domain. When these resources are frequency-based, the interfering cell does not use some of its accessible subcarriers in the frequency domain. When the yielded resources are a combination of both frequency and time, the interfering cell does not use the resources defined by frequency and time.

For a UE that supports eICIC, the existing criteria for analyzing RLF conditions may not satisfactorily address the conditions of the coordinating cells. When this UE lies in a region with severe interference where the interference is coordinated between base stations by the interfering cell giving up part of its resources, the UE measurement of the SNR or the decoding error rate of PDCCH would vary considerably, depending on whether the resources were yielded by the interfering cell or not. When the UE measures the SNR or the decoding error rate of the PDCCH for the resources, which were not yielded by the interfering cell, the UE can erroneously declare an RLF due to high interference, although the UE can still access the serving cell using the resources yielded by the interfering cell.

In a dominant interference scenario wherein the UE experiences interference from a neighboring cell, a partitioning of resources by time may help to reduce interference. As discussed above with reference to FIG. 5, a particular cell (e.g., 102c of FIG. 1) silences itself on periodic subframes, thereby allowing users from a neighbor cell (e.g., 102y or 102b) to be served without interference from the particular cell. From the point of view of users experiencing significant interference such Time Division Multiplexing (TDM) partitioning technique creates two classes of subframes. The first class includes those subframes that fall within the periodic silences and are referred to herein for convenience as "protected" or "clean" subframes. The subframes that are not protected, and may therefore experience more interference, are referred to herein as "unprotected" or "unclean" subframes.

In one heterogeneous network scenario, a macro UE under femto coverage may experience significant downlink (DL) interference. As explained above, TDM partitioning of resources allows a UE under high interference from a neighbor cell to maintain good downlink signal quality towards the serving cell. However, even if its downlink channel is protected, the macro UE in femto coverage may be power limited on the uplink (UL).

One outage scenario includes a large macro site to site distance, and a Closed Subscriber Group (CSG) user adds a femto. A non-CSG user has good downlink coverage on protected subframes but not very good uplink coverage due to limited transmit power at the UE and higher interference. It should be noted in this example that uplink transmit Power Spectral Density (PSD) is constrained by a minimum Signal to Interference plus Noise Ratio (SINR) specification at the receiver of the eNodeB and a maximum transmit power of the UE. Hence uplink transmit bandwidth may become very small. This may result in a power limited UE that uses only a fraction of its protected subframes. Therefore, available protected subframes may not be enough to support Quality of Service (QoS) requirements of the UE. Also, there may be waste because the unused physical resource blocks in the protected subframes, by definition, cannot be used by the femto cell either.

Such issues are addressed by aspects of the present disclosure. Certain aspects disclosed herein provide for applying the TDM partitioning technique to a concept of bundling wherein one eNodeB yields a bundle of subframes for use by a UE that is being serviced by another eNodeB. Such aspects are not limited to, though certainly applicable to, those scenarios where a UE serviced by a first eNodeB receives significant interference from a second eNodeB. Various aspects include a first eNodeB negotiating with a second eNodeB for the second eNodeB to yield bundles of subframes for use by the UE.

In some designs, the first eNodeB includes a macro eNodeB, and the second eNodeB includes a femto eNodeB, though the scope of designs is not so limited, as such concept can be applied to any two or more eNodeBs that may interfere with one or more UEs. The following examples refer to a macro eNodeB and a femto eNodeB, though it is understood that the concepts apply generally.

In a first example aspect, a macro cell requests a femto cell to yield multiple subframes for use by a UE serviced by the macro cell, where the UE receives interference from the femto cell. In this example, the femto cell silences on bundles that each include four contiguous subframes. Bundling four contiguous subframes is provided for in the HARQ timeline for LTE Release 8, though not in the context of creating protected subframes. This particular example leverages the bundling feature already provided by LTE and uses such feature to create protected subframes for use by a UE that is experiencing interference.

Figure 6:
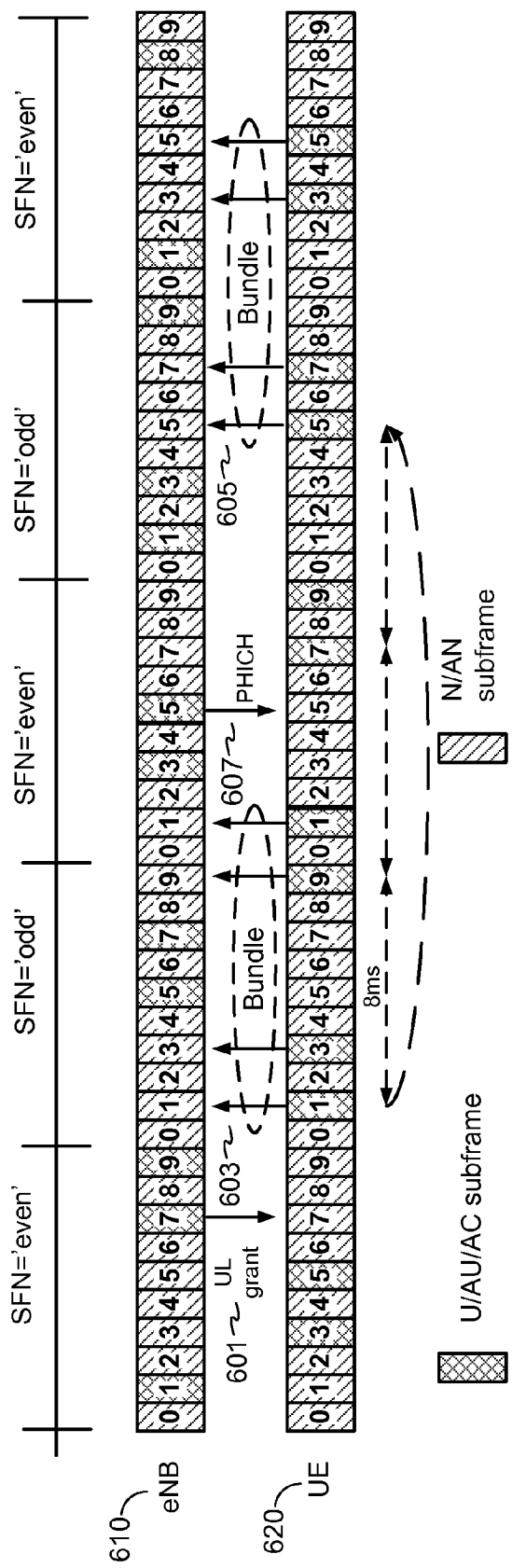
FIG. 6 is an illustration showing example timelines of subframes according to one aspect of the present disclosure.

In another example, each of the bundles includes two or more (and in this example, four) non-contiguous subframes. FIG. 6 is an illustration of exemplary downlink and uplink timelines 610, 620, respectively, of subframes for a UE and an eNodeB according to one aspect. The UE timeline (uplink) 620 is negotiated by the macro eNodeB with the femto eNodeB, where the femto eNodeB agrees to yield bundles 603, 605 of subframes, where, in this scenario, the bundles 603, 605 have non-contiguous subframes. The eNodeB configures the UE by signaling to the UE locations of the bundled subframes (e.g., bundle sizes and subframe offsets). Such configuring can come in the uplink grant 601, or another transmission. An uplink grant is used in this example, though the scope of designs is not limited to the use of an uplink grant. In fact, some designs may use any appropriate type of configuration signaling to facilitate the bundling operation including, but not limited to, upper level signaling, UE pre-configuration, uplink grants, and the like.

The example of FIG. 6 includes a few changes to the HARQ timeline because, in some instances, a retransmission may be sent with a subsequent bundle. As shown in FIG. 6, a PHICH (such as transmissions 607) is sent 4 ms after the last bundle transmission as in Release 8. However, a given bundle retransmission starts at subframe n2=n1+8*N, where n1 is the subframe in which the first bundle transmission started on the previous bundled transmission. N is a smallest integer such that n2>n_PHICH+4, where n_PHICH is the subframe in which the PHICH was sent on the downlink.

A UE receiving bundles of subframes may be allocated all of the subframes in the bundle but may use only a small fraction of the Physical Resource Blocks (PRBs) within the allocated subframes, thereby leading to resource wasting. Wasting subframes in a bundle arises due to power constraints imposed on the UE, where the UE is limited by the power at which it can transmit and the SINR it is to keep.

Some aspects provide a technique to allocate resources to the UE where waste is less by extending the concept of protected and unprotected resources to particular subbands within Physical Resource Blocks (PRBs) of the femto cell. In one example, the femto cell and the macro cell UEs communicate on uplink in a pattern according to the following vectors: femto [N, AN, AC, AC, AC, AU, AU, U], macro [U, AU, AC, AC, AC, AN, AN, N]. In such vectors, N and AN are unprotected subframes (not used by the macro cell), U and AU are protected subframes (used by the macro cell and yielded by the femto cell), and AC are common subframes (used by both cells). With a link budget deficit due to a power limitation, the macro UE receiving interference from the femto cell might otherwise be scheduled only on macro U/AU subframes. Due to the power constraints, the available U/AU subframes may be inadequate to close the link on uplink. However, the design of this example ameliorates such problem by allowing the macro cell to request additional PRBs for uplink transmission within the femto AU/AC subframes. After negotiation, the macro cell has additional protected PRBs within its AN/AC subframes in which it can schedule the UE.

From the femto cell's point of view, it loses some PRBs in its AU/AC subframes, but performance loss is relatively small because other PRBs in those subframes are still available for use by the femto cell. In other words, in some examples, the femto cell negotiates, and receives, for uplink transmission, fewer than all PRBs for a given number of subframes.

The newly-protected resources are bundled either in contiguous or non-contiguous subframes, according to the examples above. In one aspect, the newly-protected resources are bundled in contiguous subframes that are attached to the U/AU subframes, i.e., the first subframe of the bundle is a U/AU subframe. In one aspect, ACK/PDCCH is sent on U/AU subframes.

In the example above, new signaling may be added to that which is already provided by LTE Release 8. For instance, some aspects include messages between the macro cell and the femto cell that identify the locations of the PRBs that are negotiated and granted as well as the number of femto subframes in which protection applies. The signaling may be in upper layers.

Figure 7:
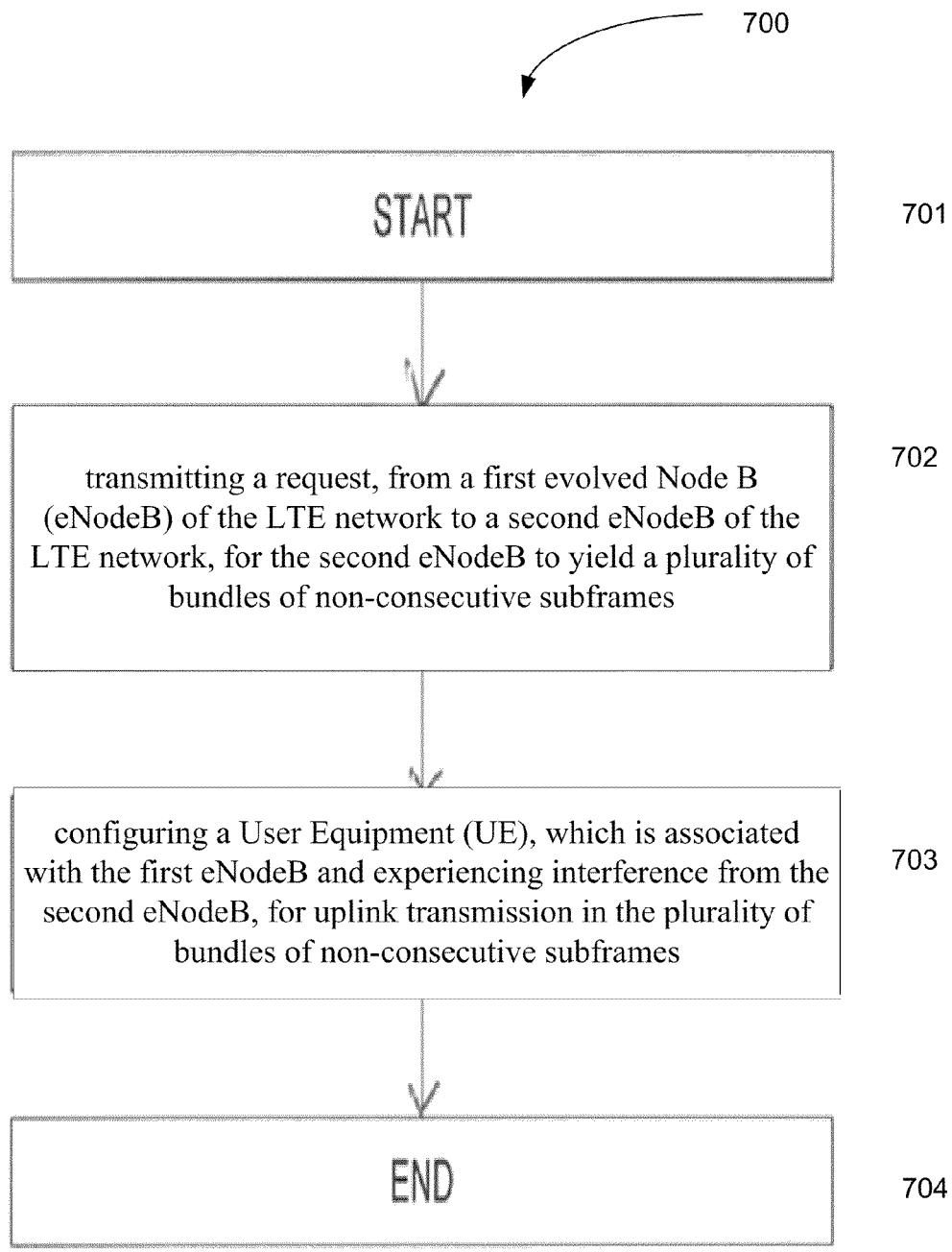
FIG. 7 shows an exemplary operational flow diagram according to one aspect of the present disclosure.

FIG. 7 shows an exemplary process 700 for a first eNodeB, where a User Equipment (UE) serviced by the first eNodeB experiences interference from a second eNodeB. The process 700 begins at block 701. At block 702, a request, from a first evolved Node B (eNodeB) of the LTE network is transmitted to a second eNodeB of the LTE network, for the second eNodeB to yield bundles of non-consecutive subframes. Block 703 may include configuring a User Equipment (UE), which is associated with the first eNodeB and experiencing interference from the second eNodeB, for uplink transmission in the bundles of non-consecutive subframes. The process 700 ends at block 704.

In one configuration, the eNodeB 110 is configured for wireless communication including a means for transmitting a request, from a first evolved Node B (eNodeB) of the LTE network to a second eNodeB of the LTE network. In one aspect, the transmitting means may be the controller/processor 440, memory 442, transmit processor 420, modulators 432a-t and antenna 434a-t configured to perform the functions recited by the transmitting means. The eNodeB 110 is also configured to include a means for configuring a User Equipment (UE), which is associated with the first eNodeB and experiencing interference from the second eNodeB. In one aspect, the configuring means may be the scheduler 444, controller/processor 440, and memory 442 configured to perform the functions recited by the configuring means. In another aspect, the aforementioned means may be a module or any apparatus configured to perform the functions recited by the aforementioned means.

Figure 8:
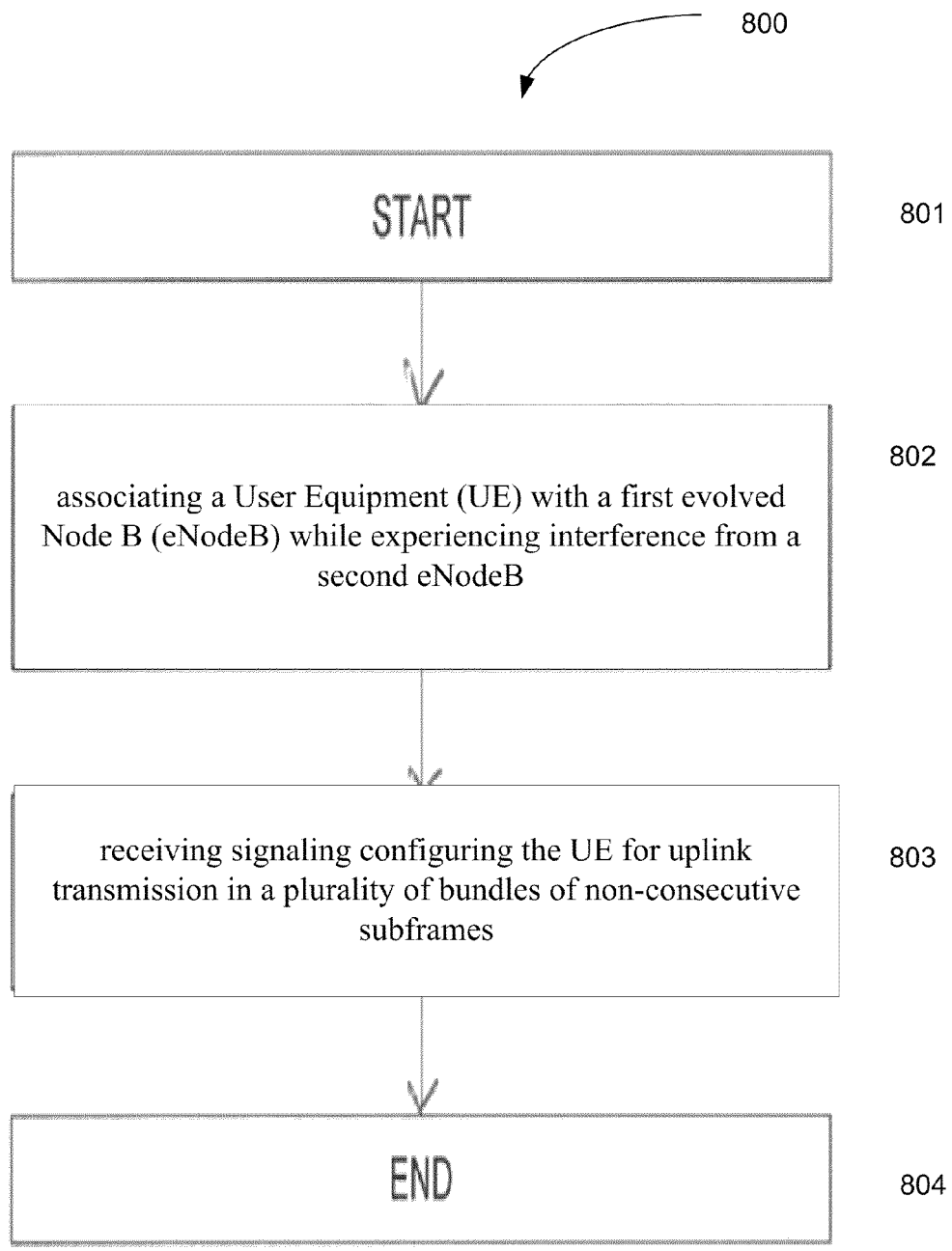
FIG. 8 shows another exemplary operational flow diagram according to one aspect of the present disclosure.

FIG. 8 shows an exemplary process 800 for a User Equipment (UE), where the UE serviced by a first eNodeB experiences interference from a second eNodeB. The process 800 begins at block 801. At block 802, a UE is associated with the first evolved Node B (eNodeB) while experiencing interference from the second eNodeB. The block 803 may include receiving signaling configuring the UE for uplink transmission in bundles of non-consecutive subframes. The process 800 ends at block 804.

In one configuration, the UE 120 is configured for wireless communication including a means for associating a User Equipment (UE) with a first evolved Node B (eNodeB) while experiencing interference from a second eNodeB. In one aspect, the associating means may be the controller/processor 480, and memory 482 configured to perform the functions recited by the associating means. The UE 120 is also configured to include a means for receiving signaling configuring the UE for uplink transmission. In one aspect, the receiving means may be the controller/processor 480, and memory 482, the receive processor 458, demodulators 454a-454r and antenna 452a-r configured to perform the functions recited by the receiving means. In another aspect, the aforementioned means may be a module or any apparatus configured to perform the functions recited by the aforementioned means.

Figure 9:
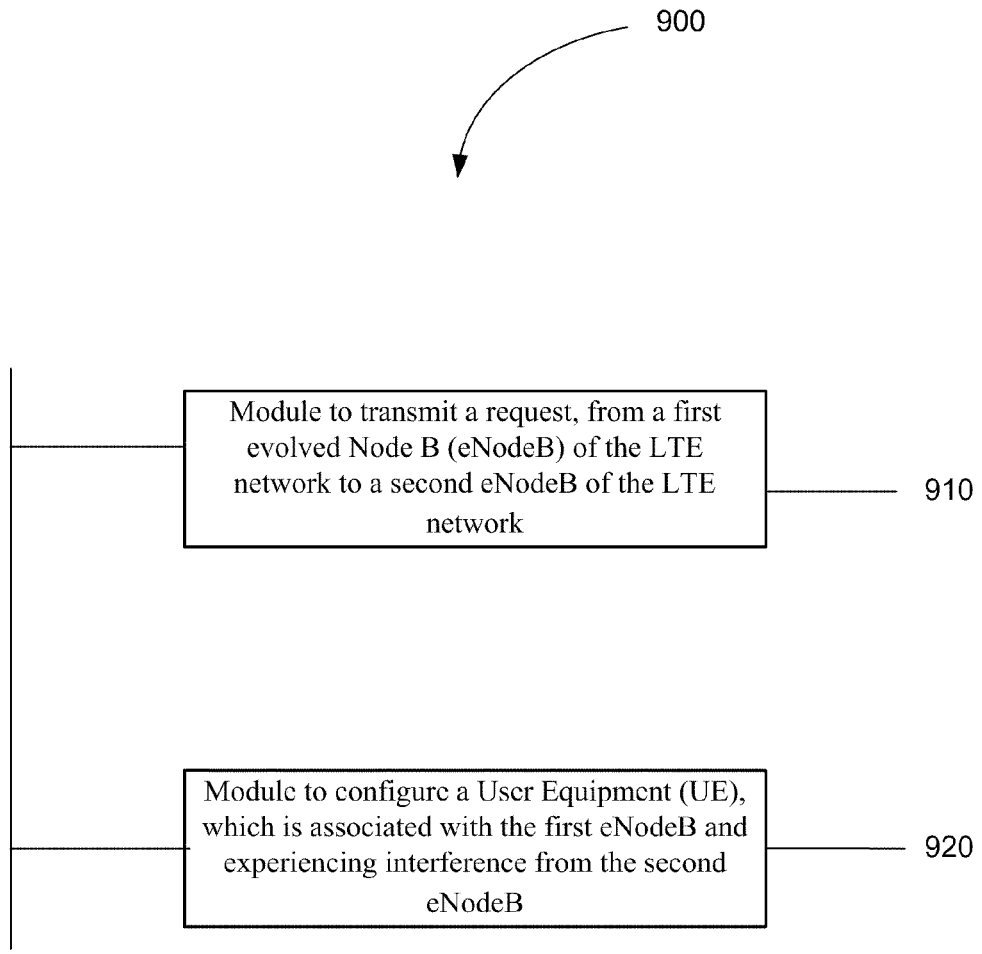
FIG. 9 shows an exemplary apparatus according to one aspect of the disclosure.

For example, FIG. 9 shows a design of an apparatus 900 for a first eNodeB. The apparatus 900 includes a module 910 to transmit a request, from a first evolved Node B (eNodeB) of the LTE network to a second eNodeB of the LTE network, for the second eNodeB to yield bundles of non-consecutive subframes, and a module 920 to configuring a User Equipment (UE), which is associated with the first eNodeB and experiencing interference from the second eNodeB, for uplink transmission in the bundles of non-consecutive subframes. The module in FIG. 9 may comprise processors, electronics devices, hardware devices, electronics components, logical circuits, memories, software codes, firmware codes, etc., or any combination thereof.

Figure 10:
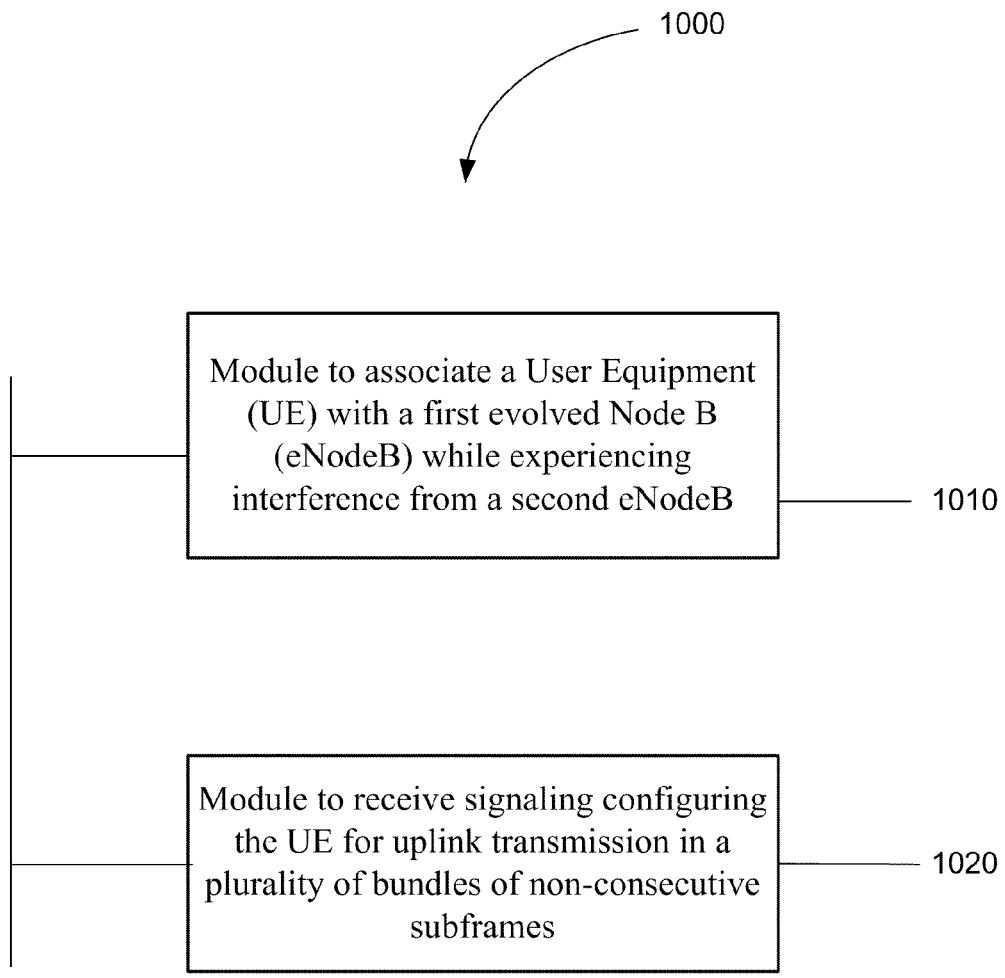
FIG. 10 shows another exemplary apparatus according to one aspect of the disclosure.

For example, FIG. 10 shows a design of an apparatus 1000 for a UE. The apparatus 1000 includes a module 1010 to associate a User Equipment (UE) with a first evolved Node B (eNodeB) while experiencing interference from a second eNodeB, and a module 1020 to receive signaling configuring the UE for uplink transmission in bundles of non-consecutive subframes. The module in FIG. 10 may comprise processors, electronics devices, hardware devices, electronics components, logical circuits, memories, software codes, firmware codes, etc., or any combination thereof.

Various aspects include advantages over conventional systems. Some aspects described above help a heterogonous network to partition resources to reduce interference using the concept of bundling. Furthermore, the example above that describes extending the concept of protected/unprotected resources to the frequency domain may add efficiency to the bundling techniques.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication in a Long Term Evolution (LTE) network, comprising:
    transmitting a request, from a first evolved Node B (eNodeB) of the LTE network to a second eNodeB of the LTE network, for the second eNodeB to yield a plurality of bundles of non-consecutive subframes, wherein the plurality of bundles of non-consecutive subframes comprises one or more resource blocks within each subframe of the plurality of bundles of non-consecutive subframes; and
    configuring a User Equipment (UE), which is associated with the first eNodeB and experiencing interference from the second eNodeB, for uplink transmission in the plurality of bundles of non-consecutive subframes.

2. The method of claim 1, further comprising indicating to the second eNodeB, the portion of resource blocks within each subframe of the plurality of bundles of non-consecutive subframes.

3. The method of claim 1, in which the configuring comprises transmitting to the UE an indication of a size and a subframe offset for each bundle of the plurality of bundles of non-consecutive subframes.

4. The method of claim 1, in which the configuring provides that a retransmission from the UE starts at subframe $n2=n1+8*N$, where n1 is a subframe in a first bundle of subframes previous to a second bundle of subframes that includes n2, and wherein N is the smallest integer such that $n2>n\_PHICH+4$, where n_PHICH is a subframe in which a Physical Hybrid Automatic Repeat Request Indicator Channel (PHICH) was sent on a downlink to the UE.

5. The method of claim 1, in which the first and second eNodeBs each receive transmissions on protected, unprotected and common subframes, and wherein transmitting the request comprises:
negotiating for at least one of: use of at least one resource block in a common subframe of the second eNodeB, and use of at least one resource block in a protected subframe of the second eNodeB.

6. A method for wireless communication in a Long Term Evolution (LTE) network, comprising:
associating a User Equipment (UE) with a first evolved Node B (eNodeB) while experiencing interference from a second eNodeB; and
receiving signaling configuring the UE for uplink transmission in a plurality of bundles of non-consecutive subframes, wherein the plurality of bundles of non-consecutive subframes comprises one or more resource blocks within each subframe of the plurality of bundles of non-consecutive subframes.

7. The method of claim 6, further comprising receiving control signaling for the plurality of bundles of non-consecutive subframes on a protected subframe before a start of bundled uplink transmission.

8. The method of claim 7, in which the control signaling is received four milliseconds (ms) before the start of the bundled uplink transmission.

9. The method of claim 6, further comprising receiving hybrid automatic retransmission request (HARQ) feedback four ms after an end of the bundled uplink transmission.

10. An apparatus for wireless communication in a Long Term Evolution (LTE) network, comprising:
means for transmitting a request, from a first evolved Node B (eNodeB) of the LTE network to a second eNodeB of the LTE network, for the second eNodeB to yield a plurality of bundles of non-consecutive subframes, wherein the plurality of bundles of non-consecutive subframes comprises one or more resource blocks within each subframe of the plurality of bundles of non-consecutive subframes; and
means for configuring a User Equipment (UE), which is associated with the first eNodeB and experiencing interference from the second eNodeB, for uplink transmission in the plurality of bundles of non-consecutive subframes.

11. An apparatus for wireless communication in a Long Term Evolution (LTE) network, comprising:
means for associating a User Equipment (UE) with a first evolved Node B (eNodeB) while experiencing interference from a second eNodeB; and
means for receiving signaling configuring the UE for uplink transmission in a plurality of bundles of non-consecutive subframes, wherein the plurality of bundles of non-consecutive subframes comprises one or more resource blocks within each subframe of the plurality of bundles of non-consecutive subframes.

12. An apparatus for wireless communication in a Long Term Evolution (LTE) network, comprising:
a memory; and
at least one processor coupled to the memory and configured:
to transmit a request, from a first evolved Node B (eNodeB) of the LTE network to a second eNodeB of the LTE network, for the second eNodeB to yield a plurality of bundles of non-consecutive subframes, wherein the plurality of bundles of non-consecutive subframes comprises one or more resource blocks within each subframe of the plurality of bundles of non-consecutive subframes; and
to configure a User Equipment (UE), which is associated with the first eNodeB and experiencing interference from the second eNodeB, for uplink transmission in the plurality of bundles of non-consecutive subframes.

13. The apparatus of claim 12, in which the processor is further configured to indicate to the second eNodeB, the portion of resource blocks within each subframe of the plurality of bundles of non-consecutive subframes.

14. The apparatus of claim 12, in which the processor configures the UE with an indication of a size and a subframe offset for each bundle of the plurality of bundles of nonconsecutive subframes.

15. The apparatus of claim 12, in which the configuring the UE provides that a retransmission from the UE starts at subframe $n2=n1+8*N$, where n1 is a subframe in a first bundle of subframes previous to a second bundle of subframes that includes n2, and wherein N is the smallest integer such that $n2>n\_PHICH+4$, where n_PHICH is a subframe in which a Physical Hybrid Automatic Repeat Request Indicator Channel (PHICH) was sent on a downlink to the UE.

16. The apparatus of claim 12, in which the first and second eNodeBs each receive transmissions on protected, unprotected and common subframes, and wherein the processor is configured to transmit the request by:
negotiating for at least one of: use of at least one resource block in a common subframe of the second eNodeB, and use of at least one resource block in a protected subframe of the second eNodeB.

17. An apparatus for power control in a long term evolution (LTE) network, comprising:
a memory; and
at least one processor coupled to the memory and configured:
to associate a User Equipment (UE) with a first evolved Node B (eNodeB) while experiencing interference from a second eNodeB; and
to receive signaling configuring the UE for uplink transmission in a plurality of bundles of non-consecutive subframes, wherein the plurality of bundles of non-consecutive subframes comprises one or more resource blocks within each subframe of the plurality of bundles of non-consecutive subframes.

18. The apparatus of claim 17, in which the processor is further configured to receive control signaling for the plurality of bundles of non-consecutive subframes on a protected subframe before a start of bundled uplink transmission.

19. The apparatus of claim 18, in which the control signaling is received four ms before the start of the bundled uplink transmission.

20. The apparatus of claim 17, in which the processor is further configured to receive hybrid automatic retransmission request (HARQ) feedback four ms after an end of the bundled uplink transmission.

21. A computer program product for wireless communications in a wireless network, comprising:
- a non-transitory computer-readable medium having program code recorded thereon, the program code comprising:
  - program code to transmit a request, from a first evolved Node B (eNodeB) of the LTE network to a second eNodeB of the LTE network, for the second eNodeB to yield a plurality of bundles of non-consecutive subframes, wherein the plurality of bundles of non-consecutive subframes comprises one or more resource blocks within each subframe of the plurality of bundles of non-consecutive subframes; and
  - program code to configure a User Equipment (UE), which is associated with the first eNodeB and experiencing interference from the second eNodeB, for uplink transmission in the plurality of bundles of non-consecutive subframes.

22. A computer program product for wireless communications in a wireless network, comprising:
- a non-transitory computer-readable medium having program code recorded thereon, the program code comprising:
  - program code to associate a User Equipment (UE) with a first evolved Node B (eNodeB) while experiencing interference from a second eNodeB; and
  - program code to receiving signaling configuring the UE for uplink transmission in a plurality of bundles of non-consecutive subframes, wherein the plurality of bundles of non-consecutive subframes comprises one or more resource blocks within each subframe of the plurality of bundles of non-consecutive subframes.

* * * * *